US012304350B2

(12) United States Patent
Lee et al.

(10) Patent No.: US 12,304,350 B2
(45) Date of Patent: May 20, 2025

(54) POWER CONVERSION SYSTEM FOR AUTONOMOUS DRIVING AND METHOD FOR CONTROLLING SAME

(71) Applicants: Hyundai Motor Company, Seoul (KR); Kia Corporation, Seoul (KR)

(72) Inventors: Ho Joong Lee, Whasung-si (KR); Joon Young Jeon, Whasung-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 505 days.

(21) Appl. No.: 17/739,777

(22) Filed: May 9, 2022

(65) Prior Publication Data

US 2023/0013714 A1    Jan. 19, 2023

(30) Foreign Application Priority Data

Jul. 7, 2021   (KR) .................. 10-2021-0089250

(51) Int. Cl.
   *B60L 58/20* (2019.01)
   *B60L 58/12* (2019.01)

(52) U.S. Cl.
   CPC .............. *B60L 58/20* (2019.02); *B60L 58/12* (2019.02); *B60L 2210/12* (2013.01)

(58) Field of Classification Search
   CPC ...... B60L 58/20; B60L 58/12; B60L 2210/12; B60L 3/0046; B60L 2210/10; B60L 2260/32; B60L 53/24; B60L 53/35; B60L 58/18; Y02T 10/70; Y02T 10/7072; B60R 16/033; B60W 60/00; B60W 2510/244; B60W 2710/244

USPC ......................................................... 320/162
See application file for complete search history.

(56) References Cited

U.S. PATENT DOCUMENTS

| 2019/0291712 A1* | 9/2019 | Symanow ................ B60K 6/46 |
| 2020/0001720 A1* | 1/2020 | Pighi ...................... B60K 35/00 |
| 2020/0377055 A1* | 12/2020 | Ando ................ B60W 50/0098 |
| 2022/0185115 A1* | 6/2022 | Divekar .............. B60W 30/181 |
| 2022/0250563 A1* | 8/2022 | Kobayashi .......... B60R 11/0264 |

FOREIGN PATENT DOCUMENTS

KR   10-2013-0024790    3/2013

* cited by examiner

*Primary Examiner* — Paul Dinh
(74) *Attorney, Agent, or Firm* — Morgan, Lewis & Bockius LLP

(57) ABSTRACT

A power conversion system for autonomous driving and a method for controlling the same, includes a first battery and a second battery; an LDC configured to convert the magnitude of a voltage, output the voltage, and charge the first battery with an output of the LDC; an autonomous driving load electrically connected to the LDC and the first battery and configured to be provided with a power voltage from the LDC or the first battery; and an autonomous driving controller electrically connected to the LDC, the first battery, and the second battery and configured to be provided with a power voltage from one of the LDC, the first battery, or the second battery, wherein the LDC is configured to determine the output of the LDC based on control parameters including the load amount of the autonomous driving load and the state of charging of the first battery and the state of charging of the second battery.

15 Claims, 4 Drawing Sheets

POWER CONVERSION SYSTEM FOR AUTONOMOUS DRIVING AND METHOD FOR CONTROLLING SAME

CROSS REFERENCE TO RELATED APPLICATION

The present application claims priority to Korean Patent Application No. 10-2021-0089250 filed on Jul. 7, 2021, the entire contents of which is incorporated herein for all purposes by this reference.

BACKGROUND OF THE PRESENT DISCLOSURE

Field of the Present Disclosure

The present disclosure relates to a power conversion system for autonomous driving and a method for controlling the same, and more specifically, to a power conversion system for autonomous driving and a method for controlling the same, wherein in connection with controlling an application and a vehicle to which an autonomous driving system is applied, not only the state of charging of the first battery, but also control parameters including the autonomous driving system requirement load are used to increase the efficiency and lifespan of the batteries and to improve the fuel efficiency of the vehicle and the application.

Description of Related Art

In connection with controlling a vehicle and an application (hereinafter, referred to as "a vehicle and the like") to which an autonomous driving system is applied, the output necessary for the autonomous driving controller is commonly supplied after voltage magnitude conversion through a low-voltage DC-DC converter (LDC) for autonomous driving loads from the main battery for supplying power necessary for the electronic device of the vehicle and the like).

Therefore, existing systems operate the main battery to supply power to all loads connected thereto, including the electronic device and autonomous driving loads, either in the case of autonomous driving of the vehicle and the like or in the case of using the electronic device without autonomous driving. That is, conventional systems have a problem in that, because the main battery is connected to autonomous driving loads, power is always continuously supplied to the autonomous driving system even when unnecessary, degrading the overall vehicle fuel efficiency.

Furthermore, even when the vehicle and the like are powered off, currents necessary for an instantaneous start at a subsequent time and currents necessary for the autonomous driving controller (also referred to as dark currents) are continuously supplied. Accordingly, conventional systems including a main battery configured to supply power to autonomous driving loads have a problem in that supply of the dark currents poses a risk of electric discharge.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a power conversion system for autonomous driving and a method for controlling the same, wherein in connection with controlling an application and a vehicle to which an autonomous driving system is applied, not only the state of charging of the first battery, but also control parameters including the autonomous driving system requirement load are used to increase the efficiency and lifespan of the batteries and to improve the fuel efficiency of the vehicle and the application.

A power conversion system for autonomous driving according to an exemplary embodiment of the present disclosure may include: a first battery and a second battery; an LDC configured to convert a magnitude of a voltage, output the converted voltage, and charge the first battery with an output of the LDC; an autonomous driving load electrically connected to the LDC and the first battery and configured to be provided with a power voltage from the LDC or the first battery; and an autonomous driving controller electrically connected to the LDC, the first battery, and the second battery and configured to be provided with a power voltage from one of the LDC, the first battery, or the second battery, wherein the LDC is configured to determine the output of the LDC based on control parameters including a load amount of the autonomous driving load, a state of charging of the first battery, and a state of charging of the second battery.

When the state of charging of the second battery is equal to or greater than a first reference value, the output of the LDC may be determined based on the state of charging of the first battery and a value obtained by subtracting an amount of load of the autonomous driving controller from the load amount of the autonomous driving load, and when the state of charging of the second battery is less than the first reference value, the output of the LDC may be determined based on the control parameters.

When the state of charging of the second battery is equal to or greater than the first reference value, the output of the LDC may be determined as a sum of a value obtained by subtracting a load amount necessary for the autonomous driving controller from the load amount of the autonomous driving load and an amount of output necessary for charging the first battery, and when the state of charging of the second battery is less than the first reference value, the output of the LDC may be determined based on the control parameters.

When the state of charging of the first battery is less than a second reference value, the output of the LDC may be determined as a sum of the load amount of the autonomous driving load and the amount of output necessary for charging the first battery, and when the state of charging of the first battery is equal to or greater than the second reference value, the output of the LDC may be determined based on the control parameters.

When the state of charging of the first battery is equal to or greater than a fourth reference value, the LDC is configured to determine the output of the LDC as 0, and when the state of charging of the first battery is less than the fourth reference value, the output of the LDC may be determined based on the control parameters.

When the state of charging of the first battery is equal to or greater than a third reference value and the load amount of the autonomous driving load is equal to or greater than a predetermined reference output, the output of the LDC may be determined as an output of the LDC having maximum efficiency in a relationship between the output and efficiency of the LDC, and when the state of charging of the first battery is equal to or greater than the third reference value and the load amount of the autonomous driving load is less than the predetermined reference output, the output of the LDC may be determined as 0.

When the state of charging of the first battery is less than the third reference value and the load amount of the autonomous driving load is equal to or greater than the predetermined reference output, the output of the LDC may be determined by the LDC as a sum of the load amount of the autonomous driving load and the amount of output necessary for charging the first battery, and when the state of charging of the first battery is less than the third reference value and the load amount of the autonomous driving load is less than the predetermined reference output, the output of the LDC may be determined as an output of the LDC having maximum efficiency in relationship between the output and efficiency of the LDC.

A method for controlling a power conversion system for autonomous driving according to an exemplary embodiment of the present disclosure is a power conversion method using the power conversion system of claim, the method including: receiving inputs of the load amount of the autonomous driving load and a state of charging of the first battery and a state of charging of the second battery; and determining an output of the LDC, based on the load amount of the autonomous driving load, the state of charging of the first battery and the state of charging of the second battery.

In the determining of the output of the LDC, when the state of charging of the second battery is equal to or greater than a first reference value, the output of the LDC may be determined as a sum of the load amount of the autonomous driving load, from which a load amount necessary for the autonomous driving controller has been subtracted, and an amount of output necessary for charging the first battery, and when the state of charging of the second battery is less than the first reference value, the output of the LDC may be determined based on control parameters.

In the determining of the output of the LDC, when the state of charging of the first battery is less than a second reference value, the output of the LDC may be determined by the LDC as a sum of the load amount of the autonomous driving load and the amount of output necessary for charging the first battery, and when the state of charging of the first battery is equal to or greater than the second reference value, the output of the LDC may be determined based on the control parameters.

In the determining of the output of the LDC, when the state of charging of the first battery is equal to or greater than a fourth reference value, the output of the LDC may be determined as 0, and when the state of charging of the first battery is less than the fourth reference value, the output of the LDC may be determined based on the control parameters.

In the determining of the output of the LDC, when the state of charging of the first battery is equal to or greater than a third reference value and the load amount of the autonomous driving load is equal to or greater than a predetermined reference output, an output of the LDC having maximum efficiency in a relationship between the output and efficiency of the LDC may be determined, and when the state of charging of the first battery is equal to or greater than the third reference value and the load amount of the autonomous driving load is less than the predetermined reference output, the output of the LDC may be determined as 0.

In the determining of the output of the LDC, when the state of charging of the first battery is less than the third reference value and the load amount of the autonomous driving load is equal to or greater than the predetermined reference output, the output of the LDC may be determined by the LDC as a sum of the load amount of the autonomous driving load and the amount of output necessary for charging the first battery, and when the state of charging of the first battery is less than the third reference value and the load amount of the autonomous driving load is less than the predetermined reference output, the output of the LDC may be determined as an output of the LDC having maximum efficiency in relationship between the output and efficiency of the LDC.

A power conversion system for autonomous driving and a method for controlling the same, according to an exemplary embodiment of the present disclosure, are advantageous in that, in connection with controlling an application and a vehicle to which an autonomous driving system is applied, not only the state of charging of the first battery, but also control parameters including the autonomous driving system requirement load may be used to increase the efficiency and lifespan of the batteries and to improve the fuel efficiency of the vehicle and the application.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
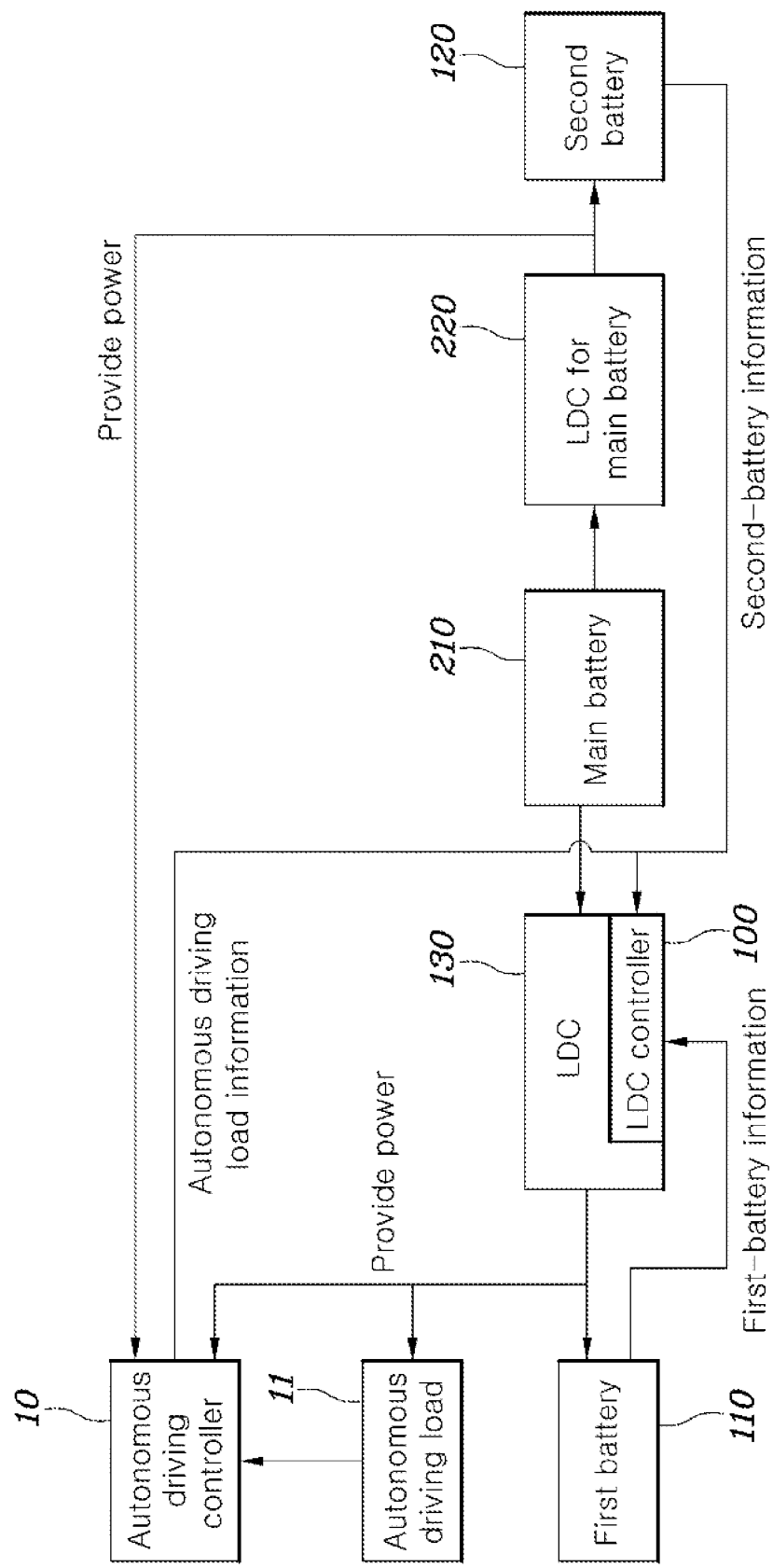
FIG. 1 illustrates the configuration of a power conversion system for autonomous driving according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural or functional descriptions of embodiments of the present disclosure, included in the specification or the application, are illustrated for describing the embodiments according to an exemplary embodiment of the present disclosure, and the embodiments according to an exemplary embodiment of the present disclosure may be implemented in various forms. It may not be construed that the embodiments according to an exemplary embodiment of the present disclosure are limited to the embodiments described in the specification or the application. Hereinafter, the embodiments of the present disclosure will be described in detail with reference to the accompanying drawings.

Figure 2:
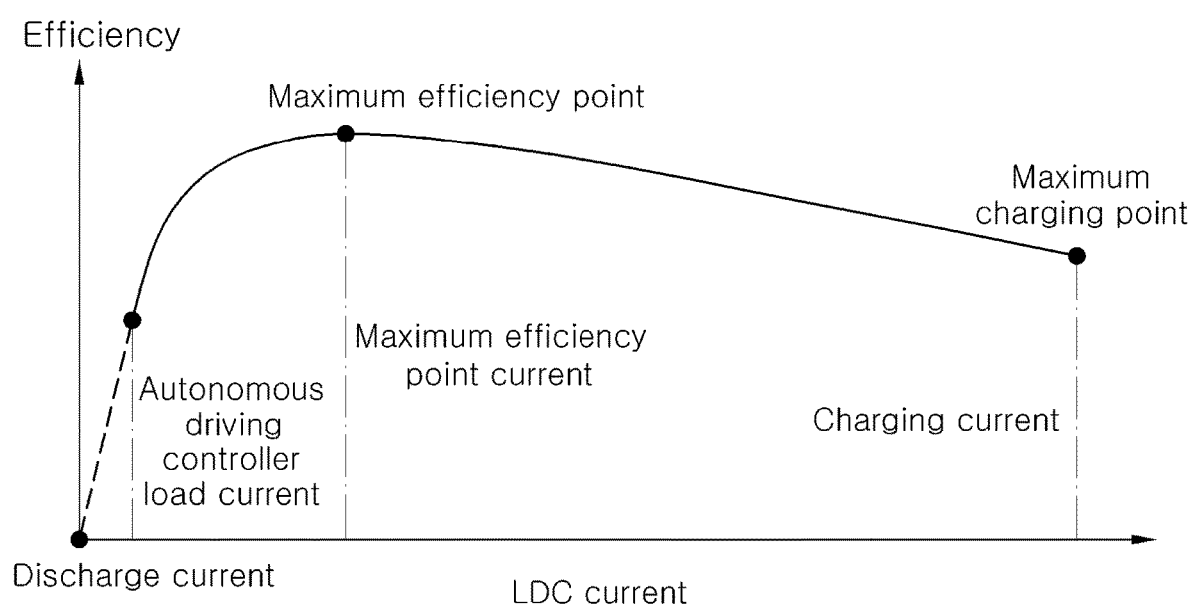
FIG. 2 is a current-efficiency graph of a power conversion system for autonomous driving according to an exemplary embodiment of the present disclosure.
Figure 3:
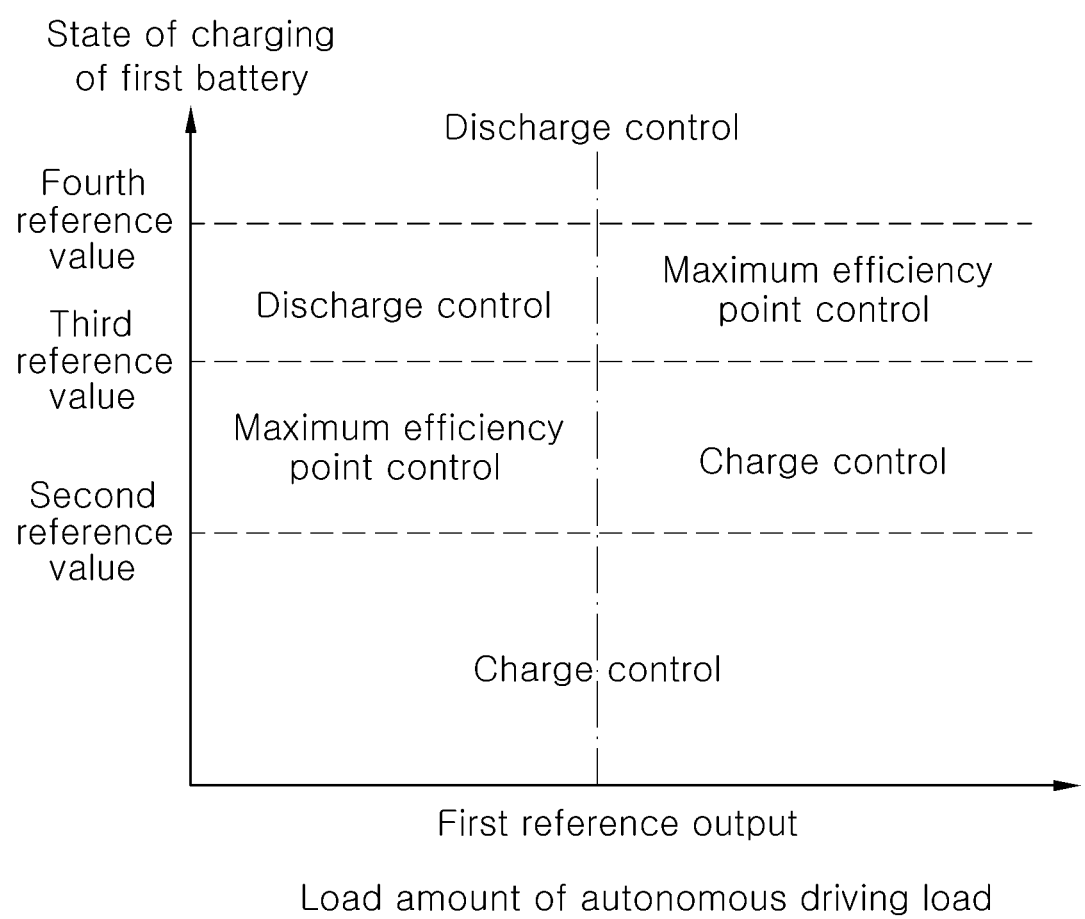
FIG. 3 is a graph showing a mechanism of a power conversion system for autonomous driving according to an exemplary embodiment of the present disclosure.
Figure 4:
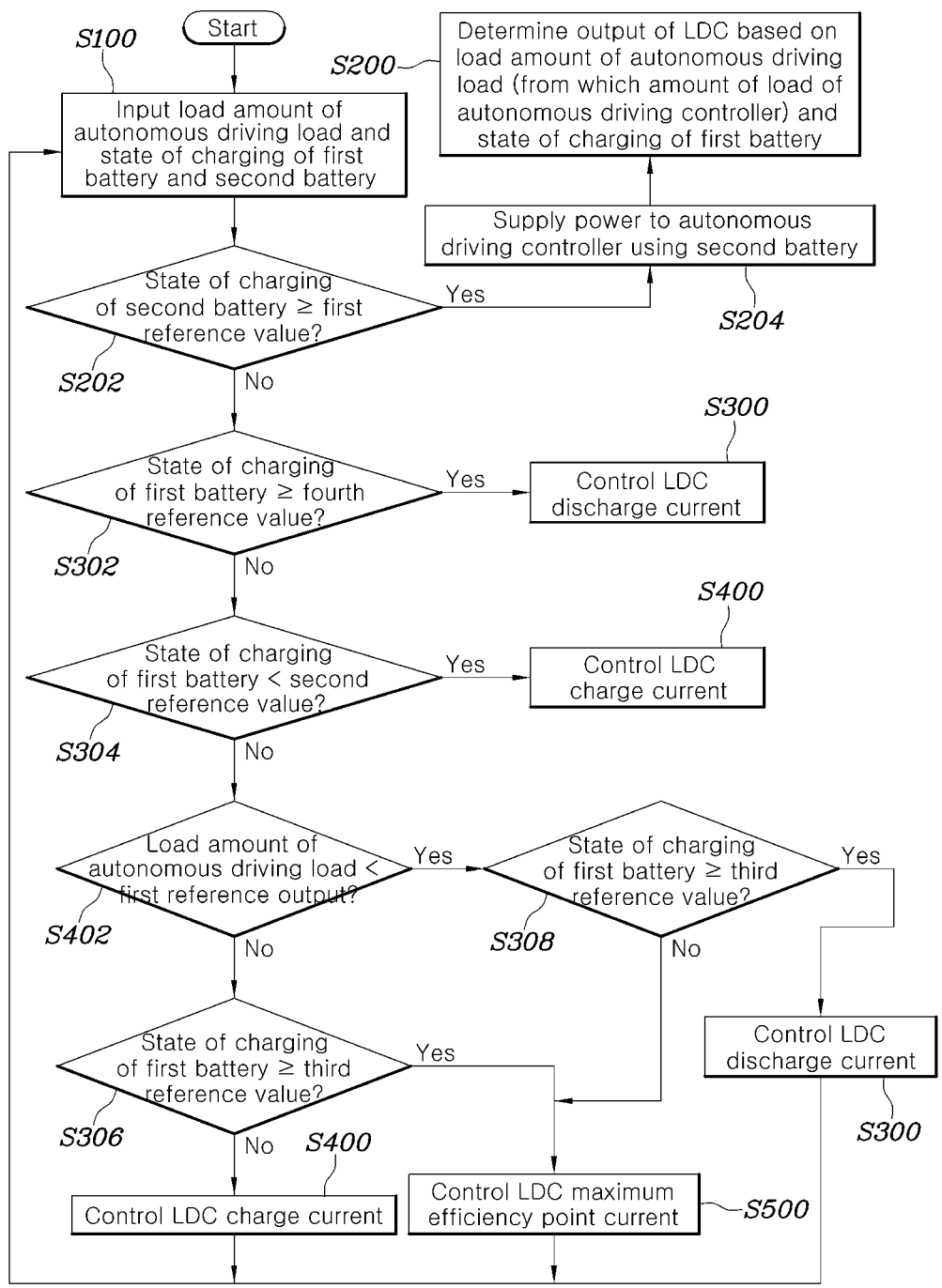
FIG. 4 is a flowchart showing a method for controlling a power conversion system for autonomous driving according to an exemplary embodiment of the present disclosure.

FIG. 1 illustrates the configuration of a power conversion system for autonomous driving according to an exemplary embodiment of the present disclosure. FIG. 2 is a current-efficiency graph of a power conversion system for autonomous driving according to an exemplary embodiment of the present disclosure. FIG. 3 is a graph showing a mechanism of a power conversion system for autonomous driving according to an exemplary embodiment of the present disclosure. FIG. 4 is a flowchart showing a method for controlling a power conversion system for autonomous driving according to an exemplary embodiment of the present disclosure.

FIG. 1 illustrates the configuration of a power conversion system for autonomous driving according to an exemplary embodiment of the present disclosure. The power conversion system for autonomous driving according to an exemplary embodiment of the present disclosure may include: a first battery 110 and a second battery 120; an LDC 130 configured to convert the magnitude of a voltage, output the voltage, and charge the first battery with an output of the LDC; an autonomous driving load 11 configured to be provided with a power voltage from the LDC or the first battery; and an autonomous driving controller 10 configured to be provided with a power voltage from one of the LDC, the first battery, or the second battery, wherein the output of the LDC 130 is determined based on control parameters including the load amount of the autonomous driving load 11 and the state of charging of the first battery 110 and the second battery 120.

FIG. 1 illustrates the configuration of the power conversion system for autonomous driving according to an exemplary embodiment of the present disclosure. When the state of charging of the second battery is equal to or greater than a first reference value, the output of the LDC is determined, based on the state of charging of the first battery and a value obtained by subtracting the amount of load of the autonomous driving controller from the load amount of the autonomous driving load, and when the state of charging of the second battery is less than the first reference value, the output of the LDC may be determined based on the control parameters. Furthermore, when the state of charging of the second battery is equal to or greater than the first reference value, the output of the LDC may be determined as the sum of a value obtained by subtracting a load amount necessary for the autonomous driving controller from the load amount of the autonomous driving load and the amount of output necessary for charging the first battery, and when the state of charging of the second battery is less than the first reference value, the output of the LDC may be determined based on the control parameters. That is, in an exemplary embodiment of the present disclosure, when the state of charging of the second battery, which is a spare battery, is sufficient, the second battery is provided for power for autonomous driving, and the power efficiency of the entire system is reconsidered by determining an output to be consumed from the main battery based on the state of charging of a battery for autonomous driving and the load amount of the autonomous driving load, excluding the second battery.

As illustrated FIG. 1, the power conversion system for autonomous driving according to an exemplary embodiment of the present disclosure is divided into three systems mainly including: a first battery 110 configured to provide power to an autonomous driving load 11; an LDC 130 configured to convert the magnitude of voltages of the first battery 110 and a main battery 210 responsible for power for the autonomous driving load 11 and an autonomous driving controller 10 and perform an output; and a main battery LDC 220 and a second battery 120, which is a spare power source mainly responsible for power for an electronic device of a vehicle or the like and partially responsible for power for the autonomous driving controller 10.

An LDC controller 100 configured to control a current of the LDC 130 receives, from the autonomous driving controller 10, an input of information related to the load amount of the autonomous driving load 11 to increase and decrease therein depending on time, the amount or order of distribution of the load amount of the load, etc. Furthermore, the LDC controller 100 receives, from the first battery and the second battery, an input of information related to the charge and discharge state, the degradation state, the charge and discharge speed, the use time, etc. Thereof. Subsequently, the LDC controller 100 determines the output of the LDC 130 based on control parameters including the load amount of the autonomous driving load 11 and the state of charging of the first battery 110 and the second battery 120 to controls a current of the LDC 130.

In a driver assistance level and a partial automation level which are low levels among autonomous driving automation levels in an existing autonomous driving assistance system, a subject which monitors a driving environment is a person, and thus the present dark current does not occupy many loads in an autonomous driving system which assists steering or acceleration and deceleration. However, an autonomous driving system, which remained as an autonomous driving assistance system of level 2, has been gradually advanced. Thus, even when the engine of a vehicle or the like is turned off, a current (also known as dark current) necessary for subsequent immediate turning-on of the engine and the autonomous driving controller may further increase. However, in the case of conditional automation or high automation in which the autonomous driving system entirely monitors a driving environment, much energy is necessary for driving manipulation or driving environment monitoring until there is a request for intervention of a driver.

In an existing system, the main battery 210 for supplying power necessary for an electronic device of a vehicle or the like converted the magnitude of a voltage through a low voltage DC-DC converter (LDC) 130 for an autonomous driving load, and supplied the voltage with a fixed output. Therefore, in the autonomous driving system, a load due to an excessive dark current may continuously occur in the main battery, and thus there was a risk of battery discharge. Furthermore, the existing system depends on the main battery, and thus, even when only the electronic device is used, operates the main battery so that power is supplied to all connected loads including the electronic device and the autonomous driving load. That is, the conventional system connects the main battery to the autonomous driving load, and thus main battery always continuously supplies power to the autonomous driving system even in the unnecessary case, causing a problem of reducing total fuel efficiency of a vehicle.

Therefore, in the power conversion system for autonomous driving according to an exemplary embodiment of the present disclosure, the LDC controller 100 operates in conjunction with all power devices excluding the main battery of the vehicle or the like, and controls an output based on control parameters, solving the above problem.

First, the LDC controller 100 excludes the main battery from parameters which should be considered to control an output of the LDC. Therefore, an exemplary embodiment of present disclosure may stably supply the output of the LDC according to the autonomous driving load, independently of the discharge state of the main battery. The LDC controller 100 determine the output of the LDC 130 based on control parameters including the autonomous driving load 11 in addition to the state of charging of the first battery 110, which is a main power source for the autonomous driving load 11, and the second battery 120 which is a spare power source.

Therefore, an exemplary embodiment of the present disclosure may prevent the low efficiency state caused by controlling the output of the LDC on the base of only the state of charging of a battery regardless of the state of a vehicle or the like. If the LDC controller 100 performs control to make the output of the LDC 130 be 0 only on the grounds that the state of charging of the first battery 110 or the second battery 120 is higher, that is, discharge control, this is inappropriate in terms of efficiency. On the other hand, only on the grounds that the state of charging of the first battery 110 or the second battery 120 is very lower, performing control to maximize the output of the LDC 130, that is, charge control, is also more undesirable in terms of efficiency and in terms of lifespan reduction due to, in particular, long exposure to high temperature.

Accordingly, in the power conversion system for autonomous driving according to an exemplary embodiment of the present disclosure, the LDC controller 100 determines the output of the LDC based on the control parameters including the autonomous driving load 11 for evaluating the state of a vehicle or the like, largely improving the state of health (SOH) of the batteries 110 and 120 and the LDC 130 in addition to improving the fuel efficiency of the vehicle or the like.

FIG. 2 is a current-efficiency graph of a power conversion system for autonomous driving according to an exemplary embodiment of the present disclosure. The horizontal axis of the graph in FIG. 2 indicates an output current of the LDC 130, and the vertical axis thereof indicates the efficiency of the LDC. As illustrated in FIG. 2, as a current of the LDC increases, the efficiency of the LDC 130 increases up to adjacent to a maximum efficiency point, and decreases from an overcurrent time point. Therefore, in terms of fuel efficiency, the output of the LDC 130 may be controlled on a maximum efficiency point current when the autonomous driving load occurs (Hereinafter, this is referred to as "maximum efficiency point control" or "LDC maximum efficiency point current control"). When the first battery 110 emits and provides a discharge current to the autonomous driving load, the LDC 130 may be controlled not to provide an output (Hereinafter, this is referred to as "discharge control" or "LDC discharge current control"). Furthermore, the LDC 130 may be controlled so that the LDC 130 provides only an autonomous driving controller 10 load as a minimum autonomous driving load in the state of not performing an autonomous mode and the other loads are provided by the second battery 120. The LDC 130 may be controlled so that a current is maximized to charge the first battery 110 responsible for the autonomous driving load regardless of the maximum efficiency, or corresponds to the sum of an output amount corresponding to a current necessary for charging and the load amount of the autonomous driving load (Hereinafter, this is referred to as "charge control" or "LDC charge current control"). Hereinafter, a description will be made of embodiments in which the control modes of LDC output are selectively performed based on control parameters.

FIG. 3 is a graph showing a mechanism of a power conversion system for autonomous driving according to an exemplary embodiment of the present disclosure. When the state of charging of the first battery 110 is less than a second reference value, the output of the LDC 130 may be determined as the sum of the load amount of the autonomous driving load and the amount of output necessary for charging the first battery. When the state of charging of the first battery is equal to or greater than the second reference value, the output of the LDC 130 may be determined based on control parameters. Furthermore, when the state of charging of the first battery is equal to or greater than a fourth reference value, the output of the LDC 130 is determined as 0, and when the state of charging of the first battery 110 is less than the fourth reference value, the output of the LDC may be determined based on the control parameters. That is, the power conversion system for autonomous driving according to an exemplary embodiment of the present disclosure may measure only the state of charging of the first battery 110 to perform charge control and discharge control of the LDC for the state of charging of the first battery 110, and may concentrate the autonomous driving load through the first battery 110.

FIG. 3 is a graph showing a mechanism of a power conversion system for autonomous driving according to an exemplary embodiment of the present disclosure. When the state of charging of the first battery is equal to or greater than a third reference value and the load amount of the autonomous driving load is equal to or greater than a first reference output, the output of the LDC may be determined as an output of the LDC having the maximum efficiency in relationship between the output and efficiency of the LDC, and when the state of charging of the first battery is equal to or greater than the third reference value and the load amount of the autonomous driving load is less than the first reference output, the output of the LDC may be determined as 0. In other words, the power conversion system for autonomous driving according to an exemplary embodiment of the present disclosure measures the state of charging of the first battery 110 and the load amount of the autonomous driving load 11 to perform maximum efficiency point control or discharge control of the LDC 130, increasing fuel efficiency.

FIG. 3 is a graph showing a mechanism of a power conversion system for autonomous driving according to an exemplary embodiment of the present disclosure. When the state of charging of the first battery is less than the third reference value and the load amount of the autonomous driving load is equal to or greater than the first reference output, the output of the LDC may be determined as the sum of the load amount of the autonomous driving load and the amount of output necessary for charging the first battery, and when the state of charging of the first battery is less than the third reference value and the load amount of the autonomous driving load is less than the first reference output, the output of the LDC may be determined as an output of the LDC having the maximum efficiency in relationship between the output and efficiency of the LDC. As a result, the power conversion system for autonomous driving according to an exemplary embodiment of the present disclosure measures the state of charging of the first battery 110 and the load amount of the autonomous driving load 11 to perform maximum efficiency point control or charge control of the LDC 130, increasing fuel efficiency.

FIG. 4 is a flowchart showing a method for controlling a power conversion system for autonomous driving according to an exemplary embodiment of the present disclosure. The method for controlling a power conversion system for autonomous driving according to an exemplary embodiment of the present disclosure is a power conversion method using a power conversion system, the power conversion method including: a step (S100) of receiving inputs of the load amount of the autonomous driving load 11 and the state of charging of the first battery 110 and the second battery 120; and a step of determining the output of the LDC 130 based on the load amount of the autonomous driving load 11 and the state of charging of the first battery 110 and the second battery 120.

The next step is a step (S204) of supplying power to the autonomous driving controller by spare power source control of the second battery 120. In the step of determining the output of the LDC, when the state of charging of the second battery is equal to or greater than a first reference value (S202), the LDC is configured to determine the output of the LDC as the sum of the load amount of the autonomous driving load, from which a load amount necessary for the autonomous driving controller has been subtracted, and an amount of output necessary for charging the first battery, and when the state of charging of the second battery is less than the first reference value, the output of the LDC may be determined based on control parameters (S200).

The next step corresponds to discharge control to make the discharge of the first battery a priority. In the step of determining the output of the LDC, when the state of charging of the first battery is equal to or greater than a fourth reference value (S302), the output of the LDC may be determined as 0 (S300), and when the state of charging of the first battery is less than the fourth reference value, the output of the LDC may be determined based on the control parameters.

The next step corresponds to charge control to make charge of the first battery 110 a priority. In the step of determining the output of the LDC, when the state of charging of the first battery is less than a second reference value (S304), the output of the LDC may be determined as the sum of the load amount of the autonomous driving load and the amount of output necessary for charging the first battery (S400), and when the state of charging of the first battery is equal to or greater than the second reference value, the output of the LDC may be determined based on the control parameters.

The next step corresponds to selective control of maximum efficiency point control and discharge control. In the step of determining the output of the LDC, when the state of charging of the first battery is equal to or greater than a third reference value (S306) and the load amount of the autonomous driving load is equal to or greater than a first reference output (S402), the output of the LDC having maximum efficiency in relationship between the output and efficiency of the LDC may be determined (S500), and when the state of charging of the first battery is equal to or greater than the third reference value (S308) and the load amount of the autonomous driving load is less than the first reference output (S402), the output of the LDC may be determined as 0 (S300).

The next step corresponds to selective control of maximum efficiency point control and charge control. In the step of determining the output of the LDC, when the state of charging of the first battery is less than the third reference value (S400) and the load amount of the autonomous driving load is equal to or greater than the first reference output (S402), the output of the LDC may be determined as the sum of the load amount of the autonomous driving load and the amount of output necessary for charging the first battery (S400), and when the state of charging of the first battery is less than the third reference value (S308) and the load amount of the autonomous driving load is less than the first reference output (S402), the output of the LDC may be determined as an output of the LDC having maximum efficiency in relationship between the output and efficiency of the LDC (S500).

The present disclosure relates to a power conversion system for autonomous driving and a method for controlling the same, and to a power conversion system for autonomous driving and a method for controlling the same, wherein the output of an LDC is determined through control parameters that indicate an external environment of a vehicle or the like and the state of a power supply device thereof.

In the existing system, the main battery 210 for supplying power necessary for an electronic device of a vehicle or the like converts the magnitude of a voltage through the low voltage DC-DC converter (LDC) 130 for an autonomous driving load, and power is supplied as a fixed output. Therefore, the autonomous driving system involved a risk of battery discharge due to excessive dark current in the main battery. Furthermore, the existing system depends on the main battery, and thus when power is supplied to the electronic device, power is always continuously supplied to the autonomous driving system even when autonomous driving control is unnecessary, causing a problem of reducing total fuel efficiency of a vehicle.

However, the power conversion system for autonomous driving and the method for controlling the same according to an exemplary embodiment of the present disclosure control the output of the LDC by use of not only the state of charging of the first battery but also control parameters including an autonomous driving system requirement load. The LDC controller 100 determines the output of the LDC 130 based on not only the state of charging of the first battery 110, which is a main power source of the autonomous driving load 11, and the second battery 120 which is a spare power source, but also control parameters including the autonomous driving load 11. Thus, the exemplary embodiment minimizes the low efficiency and lifespan reduction of the LDC, caused by controlling the output of the LDC based on only the state of charging of a battery regardless of the state of a vehicle or the like. Therefore, in the power conversion system for autonomous driving according to an exemplary embodiment of the present disclosure, the LDC controller 100 determines the output of the LDC based on control parameters including the autonomous driving load 11 for evaluating the state of the vehicle or the like, largely improving the state of health (SOH) of the batteries 110 and 120 and the LDC 130 in addition to improving the fuel efficiency of the vehicle or the like.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A power conversion system for autonomous driving, the power conversion system comprising:
   a first battery and a second battery;
   a low voltage DC-DC converter (LDC) configured to convert a magnitude of a voltage, output the converted voltage, and charge the first battery with an output of the LDC;
   an autonomous driving load electrically connected to the LDC and the first battery and configured to be provided with a power voltage from the LDC or the first battery; and
   an autonomous driving controller electrically connected to the LDC, the first battery, and the second battery and configured to be provided with a power voltage from one of the LDC, the first battery, or the second battery,
   wherein the LDC is configured to determine the output of the LDC based on control parameters including a load amount of the autonomous driving load, a state of charging of the first battery, and a state of charging of the second battery, and
   wherein when the state of charging of the second battery is equal to or greater than a first reference value, the LDC is configured to determine the output of the LDC based on a value obtained by subtracting an amount of load of the autonomous driving controller from the load amount of the autonomous driving load.

2. The power conversion system of claim 1, wherein when the state of charging of the second battery is equal to or greater than the first reference value, the LDC is configured to determine the output of the LDC based on the state of charging of the first battery and the value, and when the state of charging of the second battery is less than the first reference value, the LDC is configured to determine the output of the LDC based on the control parameters.

3. The power conversion system of claim 1, wherein when the state of charging of the second battery is equal to or greater than the first reference value, the LDC is configured to determine the output of the LDC as a sum of the value and an amount of output necessary for charging the first battery, and when the state of charging of the second battery is less than the first reference value, the LDC is configured to determine the output of the LDC based on the control parameters.

4. The power conversion system of claim 3, wherein when the state of charging of the first battery is equal to or greater than a fourth reference value, the LDC is configured to determine the output of the LDC as 0, and when the state of charging of the first battery is less than the fourth reference value, the LDC is configured to determine the output of the LDC based on the control parameters.

5. The power conversion system of claim 4,
   wherein, in the determining of the output of the LDC, when the state of charging of the first battery is equal to or greater than a third reference value and the load amount of the autonomous driving load is equal to or greater than a predetermined reference output, the LDC is configured to determine the output of the LDC as an output of the LDC having maximum efficiency in a relationship between the output and efficiency of the LDC, and when the state of charging of the first battery is equal to or greater than the third reference value and the load amount of the autonomous driving load is less than the predetermined reference output, the LDC is configured to determine the output of the LDC as 0, and wherein the fourth reference value is greater than the third reference value.

6. The power conversion system of claim 4,
wherein, in the determining of the output of the LDC, when the state of charging of the first battery is less than a third reference value and the load amount of the autonomous driving load is equal to or greater than the predetermined reference output, the LDC is configured to determine the output of the LDC as a sum of the load amount of the autonomous driving load and the amount of output necessary for charging the first battery, and when the state of charging of the first battery is less than the third reference value and the load amount of the autonomous driving load is less than the predetermined reference output, the LDC is configured to determine the output of the LDC as an output of the LDC having maximum efficiency in relationship between the output and efficiency of the LDC, and
wherein the fourth reference value is greater than the third reference value.

7. The power conversion system of claim 1, wherein when the state of charging of the first battery is less than a second reference value, the LDC is configured to determine the output of the LDC as a sum of the load amount of the autonomous driving load and an amount of output necessary for charging the first battery, and when the state of charging of the first battery is equal to or greater than the second reference value, the LDC is configured to determine the output of the LDC based on the control parameters.

8. The power conversion system of claim 7,
wherein when the state of charging of the first battery is equal to or greater than a third reference value and the load amount of the autonomous driving load is equal to or greater than a predetermined reference output, the LDC is configured to determine the output of the LDC as an output of the LDC including maximum efficiency in a relationship between the output and efficiency of the LDC, and when the state of charging of the first battery is equal to or greater than the third reference value and the load amount of the autonomous driving load is less than the predetermined reference output, the LDC is configured to determine the output of the LDC as 0, and
wherein the third reference value is greater than the second reference value.

9. The power conversion system of claim 7,
wherein when the state of charging of the first battery is less than the third reference value and the load amount of the autonomous driving load is equal to or greater than a predetermined reference output, the LDC is configured to determine the output of the LDC as a sum of the load amount of the autonomous driving load and the amount of output necessary for charging the first battery, and when the state of charging of the first battery is less than a third reference value and the load amount of the autonomous driving load is less than the predetermined reference output, the LDC is configured to determine the output of the LDC as an output of the LDC having maximum efficiency in relationship between the output and efficiency of the LDC, and
wherein the third reference value is greater than the second reference value.

10. A method for controlling a power conversion system for autonomous driving including a first battery and a second battery, a low voltage DC-DC converter (LDC), an autonomous driving load and an autonomous driving controller, the method comprising:
receiving inputs of a load amount of the autonomous driving load and a state of charging of the first battery and a state of charging of the second battery; and
determining an output of the LDC, based on the load amount of the autonomous driving load, the state of charging of the first battery and the state of charging of the second battery,
wherein the LDC is configured to convert a magnitude of a voltage, output the converted voltage, and charge the first battery with the output of the LDC,
wherein the autonomous driving load is electrically connected to the LDC and the first battery and configured to be provided with a power voltage from the LDC or the first battery,
wherein the autonomous driving controller is electrically connected to the LDC, the first battery, and the second battery and configured to be provided with a power voltage from one of the LDC, the first battery, or the second battery, and
wherein the LDC is further configured to determine the output of the LDC based on control parameters including the load amount of the autonomous driving load, the state of charging of the first battery, and the state of charging of the second battery.

11. The method of claim 10, wherein, in the determining of the output of the LDC, when the state of charging of the second battery is equal to or greater than a first reference value, the LDC is configured to determine the output of the LDC as a sum of the load amount of the autonomous driving load, from which a load amount necessary for the autonomous driving controller has been subtracted, and an amount of output necessary for charging the first battery, and when the state of charging of the second battery is less than the first reference value, the LDC is configured to determine the output of the LDC based on the control parameters.

12. The method of claim 10, wherein, in the determining of the output of the LDC, when the state of charging of the first battery is less than a second reference value, the LDC is configured to determine the output of the LDC as a sum of the load amount of the autonomous driving load and an amount of output necessary for charging the first battery, and when the state of charging of the first battery is equal to or greater than the second reference value, the LDC is configured to determine the output of the LDC based on the control parameters.

13. The method of claim 12,
wherein, in the determining of the output of the LDC, when the state of charging of the first battery is equal to or greater than a fourth reference value, the LDC is configured to determine the output of the LDC as 0, and when the state of charging of the first battery is less than the fourth reference value, the LDC is configured to determine the output of the LDC based on the control parameters, and wherein the fourth reference value is greater than the second reference value.

14. The method of claim 13, wherein, in the determining of the output of the LDC, when the state of charging of the first battery is equal to or greater than a third reference value and the load amount of the autonomous driving load is equal to or greater than a predetermined reference output, the LDC is configured to determine the output of the LDC as an output of the LDC having maximum efficiency in a relationship between the output and efficiency of the LDC, and when the state of charging of the first battery is equal to or greater than the third reference value and the load amount of the autonomous driving load is less than the predetermined reference output, the LDC is configured to determine the output of the LDC as 0, and wherein the fourth reference value is greater than the third reference value and the third reference value is greater than the second reference value.

15. The method of claim 13, wherein, in the determining of the output of the LDC, when the state of charging of the first battery is less than a third reference value and the load amount of the autonomous driving load is equal to or greater than a predetermined reference output, the LDC is configured to determine the output of the LDC as a sum of the load amount of the autonomous driving load and the amount of output necessary for charging the first battery, and when the state of charging of the first battery is less than the third reference value and the load amount of the autonomous driving load is less than the predetermined reference output, the LDC is configured to determine the output of the LDC as an output of the LDC having maximum efficiency in relationship between the output and efficiency of the LDC, and wherein the fourth reference value is greater than the third reference value and the third reference value is greater than the second reference value.

* * * * *